United States Patent [19]

Ede

[11] 4,128,118
[45] Dec. 5, 1978

[54] TOOLING JIG

[75] Inventor: Douglas F. C. Ede, Tunbridge Wells, England

[73] Assignee: Bondgrade Limited, Slough, England

[21] Appl. No.: 762,712

[22] Filed: Jan. 26, 1977

[30] Foreign Application Priority Data

Jan. 27, 1976 [GB] United Kingdom ............... 3150/76
May 4, 1976 [GB] United Kingdom ............. 18259/76

[51] Int. Cl.² ............................................. B27C 5/10
[52] U.S. Cl. .................... 144/134 D; 83/455; 144/136 C
[58] Field of Search ........... 144/134 R, 136 C, 134 D; 83/455, 456; 90/12 R, 11 R

[56] References Cited

U.S. PATENT DOCUMENTS

| 2,752,961 | 7/1956 | Melgaard | 144/134 D X |
| 3,003,527 | 10/1961 | Fortune | 144/134 D X |
| 3,008,359 | 11/1961 | Mackey | 408/115 |
| 3,046,818 | 7/1962 | Saha | 408/115 X |
| 3,062,075 | 11/1962 | Saha | 408/115 X |
| 3,392,607 | 7/1968 | Gieseke | 408/115 |
| 3,860,050 | 1/1975 | Banks | 144/144.5 |
| 4,018,120 | 4/1977 | Pastore | 83/455 X |

Primary Examiner—Willie G. Abercrombie
Attorney, Agent, or Firm—Fleit & Jacobson

[57] ABSTRACT

A tooling jig is described for accurately cutting planar material, such as laminate faced chipboard. A base board has a guide fence extending therealong which has a straight edge against which one edge of the workpiece is clamped. A bridge is secured to the base to overlie the workpiece and the bridge has a guideway thereon extending accurately perpendicular to the straight edge, the guideway being adapted to allow for movement therealong a router. The router will finish accurately a workpiece which has been cut slightly overlength, the edge machined by the router being accurately perpendicular both to the edge against the guide fence and to the faces of the chipboard.

13 Claims, 10 Drawing Figures

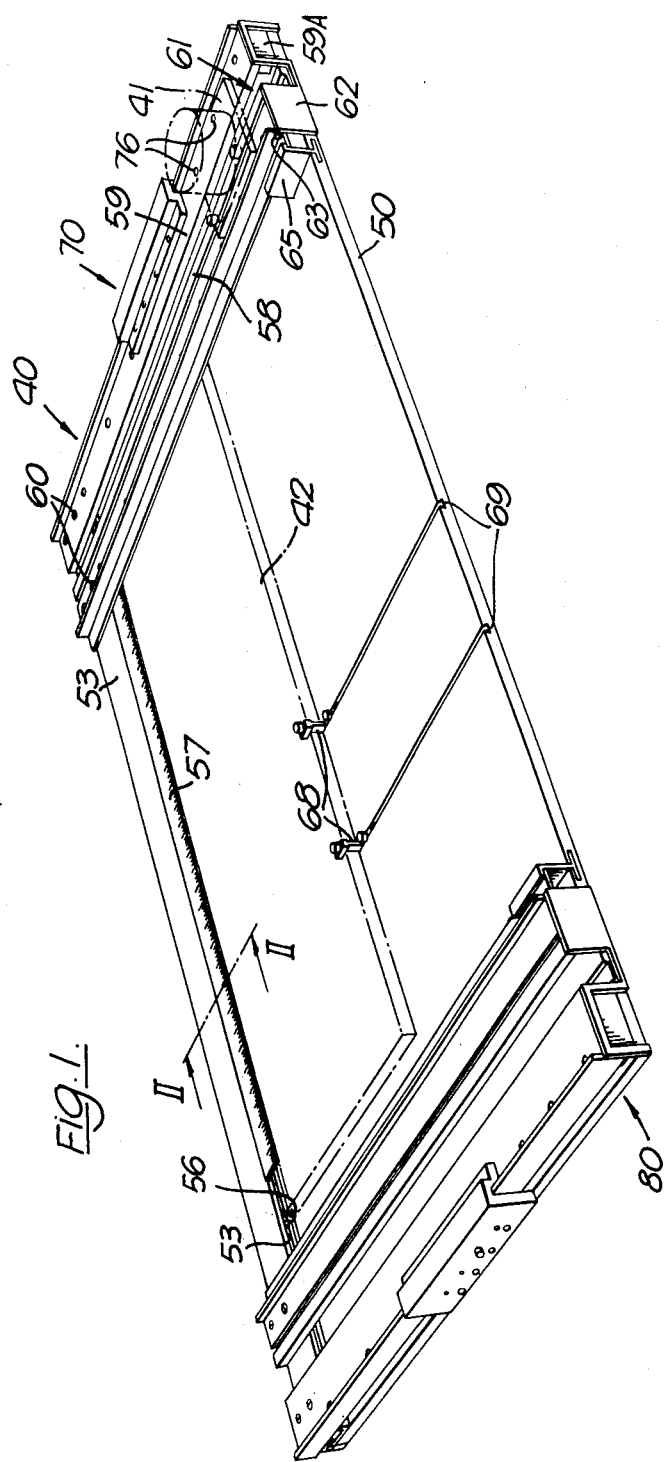

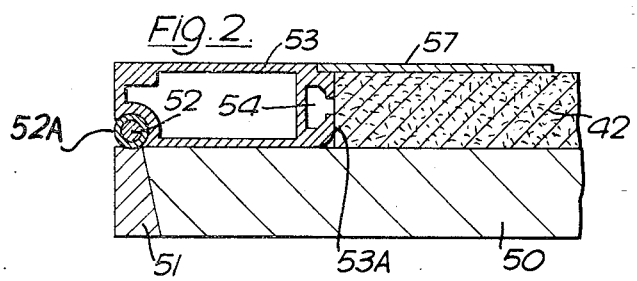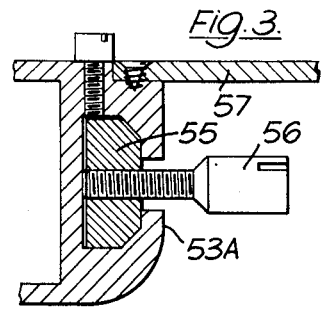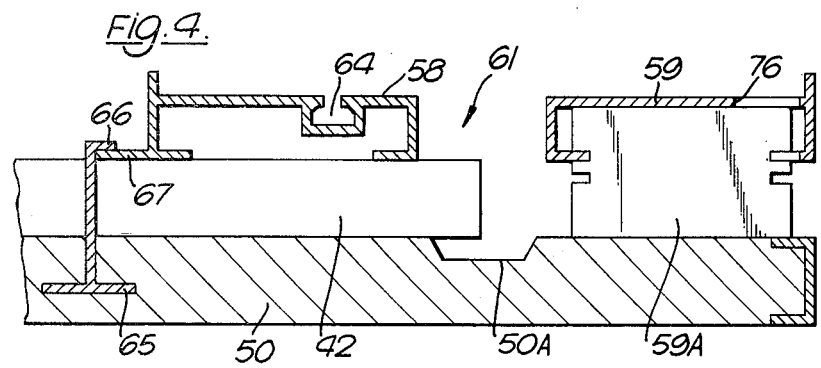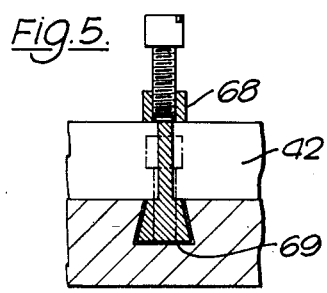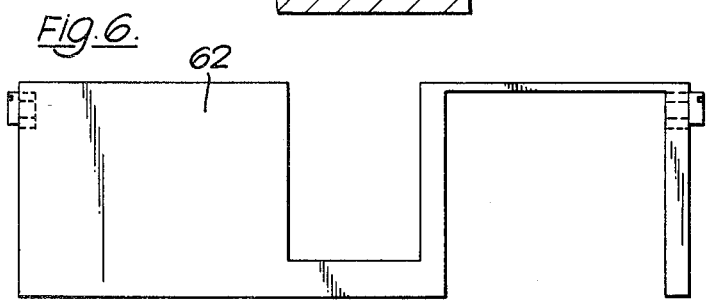

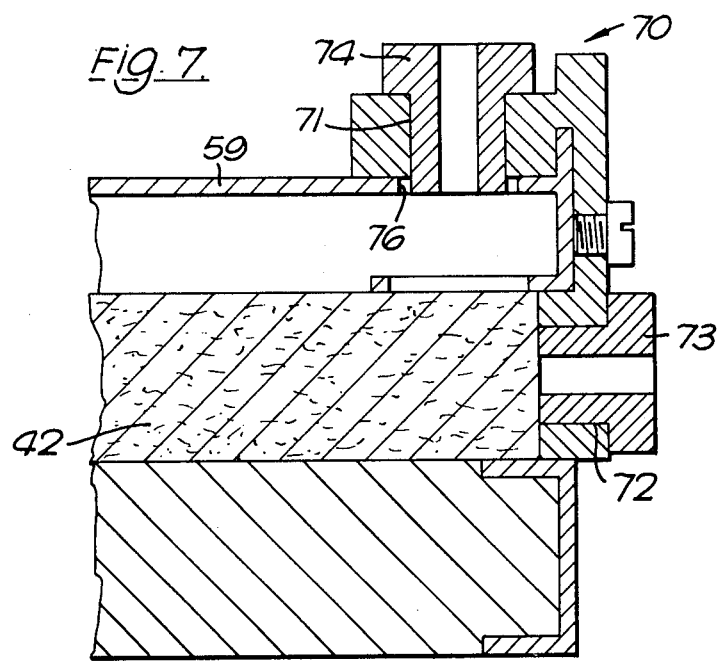
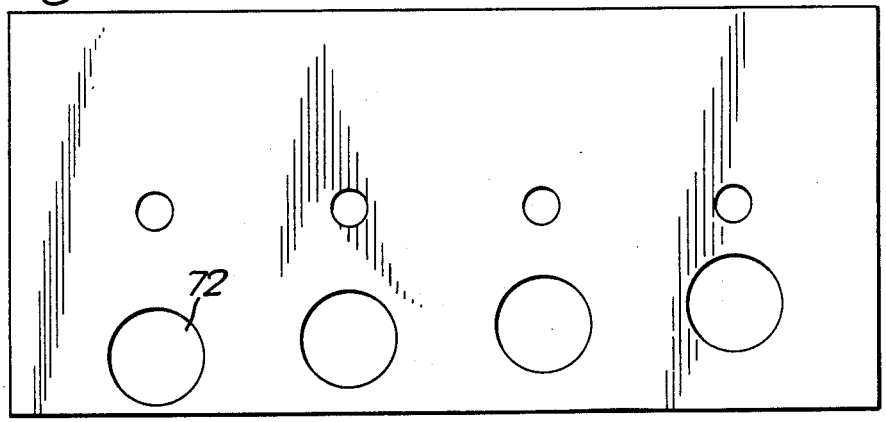
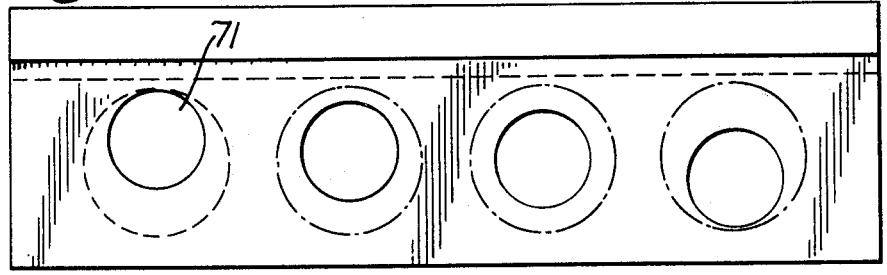

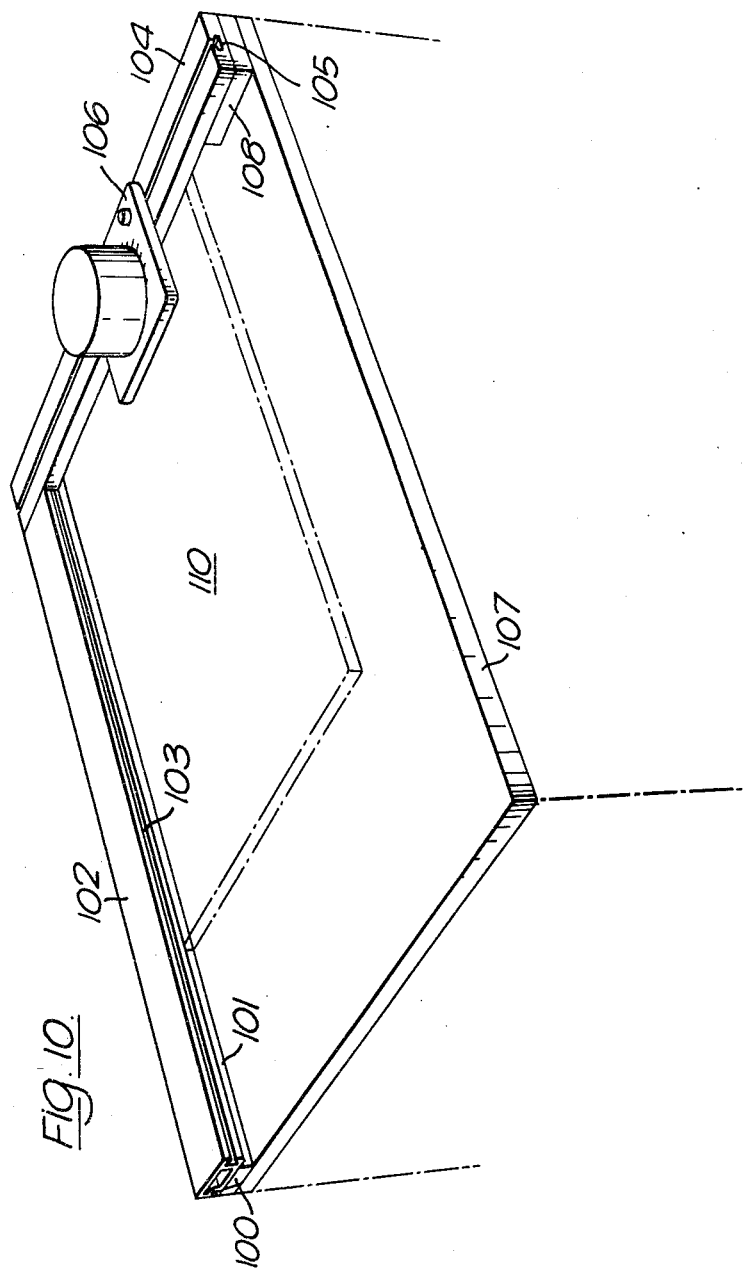

TOOLING JIG

The present invention relates to tooling jigs for carrying out tooling operations on planar material.

In handling of planar material, such as chipboard and especially chipboard which is faced with resin impregnated laminate, it is difficult accurately to cut the chipboard to close tolerances. One of the problems particularly, when it is faced with a laminate, is that the laminate itself chips away from the chipboard as it is cut. When one is attempting to make furniture of this material, in particular kitchen furniture such as kitchen cupboards, it is very important that the dimensions of the chipboard should be extremely accurate, and in particular that the cut should be perpendicular first to the planar faces of the chipboard and secondary perpendicular to the longitudinal dimension of the chipboard. It is particularly difficult for the "do-it-yourself" man to achieve such accuracy with conventional tools.

It is now proposed, according to the present invention, to provide a tooling jig comprising a base, a guide fence on said base defining a straight edge, a bridge secured to said base positioned to overlie a workpiece placed against said fence; and a guideway on said bridge extending accurately perpendicular to said straight edge, said guideway being adapted to guide for movement therealong a router.

By "router" is meant either a commercially available appliance including a very high speed motor rotating the routing tool itself at a speed of the order of 30,000 r.p.m. or a similar tool or a conventional electric drill provided with a rasp type cutter. Such a construction would require a special cradle to mount the drill on the guideway.

With such a construction, when the side face of a workpiece is placed on a support such as a table and against the fence, the router can provide an accurate finish to the end face of the board. This end face can be precut, or preferably the bridge is provided, within the guideway, with a slot through which can pass a saw, so that the workpiece can be sawn approximately to the desired length, but slightly longer of course, and then the workpiece can be finished using the router.

In one embodiment of jig according to the invention, the base includes a baseboard with guide-fence extending upwardly therefrom. The bridge may then be hinged to the baseboard, by conventional hinges or by mounting it on the fence, the fence itself being constructed with a built-in hinge, for example, by forming it as a profiled aluminium section. The bridge may then be clamped to the baseboard by a bolt extending through the bridge and threadably engaging a female thread mounted on the baseboard, the baseboard and bridge then being provided with a number of locations for the bolt. However, in a preferred construction, the bridge is clamped by a sliding catch movable transversely of the guideway in a channel formed in the baseboard. The lower surface of the bridge may be provided with some suitable gripping device for gripping the workpiece and this may comprise, for example, a strip of resilient material, such as rubber, extending along the length of the bridge, that is transverse to the guide fence.

The guide fence itself is preferably provided with a calibration to facilitate the cutting of pieces accurately to a measured length. For this purpose, the fence may have adjustable stops slidable therealong and provided with a marking to register with the calibration of the fence. If the fence is formed of the aluminium profiled section mentioned above, then this profile may be provided with a suitable guideway for such an adjustable stop.

In order securely to hold the workpiece in position, an adjustable clamp may be provided, this being movable towards and away from the fence.

The above described jig is particularly satisfactory for providing a high quality cut end to a length of laminate faced chipboard. In certain circumstances, it may be desirable to cut the chipboard along its length and for a longitudinal edge to be machined accurately. For this purpose, the routing tool may be fixed to the base board and the workpiece moved relative thereto, and in an alternative construction, the workpiece may be clamped and the router moved on the bridge. However, in a preferred construction, the router is clampable at any desired location on the bridge.

If desired, two bridges may be provided associated with the same guide fence, one at each end of the guide fence, so that both ends of the same workpiece can be machined off square.

The bridge may be provided with a device for accurately locating holes in the edge or face of the workpiece to be machined. This may include a slider member movable along the bridge and provided with one or more holes on a portion of the device at the side of the bridge, and one or more holes on a portion of the device at the top of the bridge, these holes being adapted to receive a hardened bush through which a drill may be passed. Preferably, four holes are provided on the top and side of the device, these holes being so positioned as to provide a central hole in four different thicknesses of chipboard. The device is preferably clampable at a specific position on the bridge. The bridge itself will have holes at specific locations for the passage of the drill at certain desired spacings from the fence, so that the holes will be drilled at the correct spacing on various workpieces of standard width.

The guide fence may itself also be provided with holes at specific intervals, for example 32 mm centres, which will receive another bush to place holes accurately along the edge of the workpiece for a hinge or bracket. A special calibrating device may be provided to enable holes to be placed accurately on the other side of the panel and on the same line perpendicular to the leading edge.

Special mountings may be provided to accommodate all routers and saws which could be used on the bridge.

The router may be provided with a cutter to enable grooves or rebates to be formed laterally and/or longitudinally of the workpiece. Locating stops may be provided on the base board to enable a workpiece to be moved accurately at 45° to the bridge, so that mitred joints of high precision may be formed on wood or aluminium sections using a standard drill or router.

If desired, a thicknessing operation may be carried out on the workpiece up to the full length of the bridge, but in practice, it will probably be restricted to four inches, in all cases using standard do-it-yourself routers or drills.

It is contemplated that fixings may be provided to enable additional accessories to be placed on the assembly so that turning, width cutting and bevel cutting, planing and sanding can be achieved using the jig according to the invention.

In order that the invention may more readily be understood, the following description is given, merely by way of example, reference being made to the accompanying drawings, in which:

FIG. 1 is a perspective view of one embodiment of tooling jig according to the invention;

FIG. 2 is a partial section along the line II—II of FIG. 1;

FIG. 3 is an enlarged partial section of the fence showing the adjustable stop;

FIG. 4 is a partial section illustrating the construction of the bridge;

FIG. 5 is a section showing workpiece clamping arrangements;

FIG. 6 is an enlarged elevation showing the end member of the bridge;

FIG. 7 is an enlarged section of a device for drilling holes at desired locations;

FIGS. 8 and 9 are side elevation and plan of the device of FIG. 7; and

FIG. 10 is a perspective view of a further embodiment of device according to the invention.

The preferred embodiment of jig according to the invention is illustrated in FIGS. 1 to 9. As seen in FIGS. 1 and 2, a base board 50 has attached thereto a hinge member 51 having a cylindrical portion 52 extending along its length, this engaging conventional hinge lugs 52A mounted on member 51 in a cooperating recess in a guide fence section 53. The guide fence has a longitudinally extending straight edge 53A and a channel 54 to accommodate an adjustable stop 55 (FIG. 3) securable in place by a bolt 56. A calibrated strip 57 is mounted on the top of the guide fence 53.

A bridge 40 as can be seen in FIGS. 1 and 4, is formed of two profiled aluminium section members 58 and 59 which are held on by screws 60 to the fence 53. The members 58 and 59 are spaced apart to provide a slot 61 to accommodate a saw, these being spaced apart by end member 62, with fixing screws 63 passing through lugs on member 62 and holding the members 58 and 59 to the end member 62. Member 59 has a removable support block 59A positioned as shown.

As can be seen in FIG. 4, the member 58 is provided with a generally dovetail guideway 64 in which can slide a guideway follower on the router. The router 41 can either be readily slidable to enable the end of the workpiece to be machined, or it can be clamped up at any desired transverse location on the bridge, so that the workpiece can be moved longitudinally along the edge of the guide fence 53 to form a longitudinal machined edge.

As shown in FIGS. 1 and 4, the bridge is held down by a clamping device 65 which is slidable in an inverted T-shaped groove formed transversely in the base board 50, the clamping device 65 having an overturned horizontally extending lip 66 engaging a foot 67 of the section 58. This is an extremely simple and effective clamping method.

In order to hold a workpiece 42 against the fence, as illustrated in FIGS. 1 and 5, further clamping members 68 are slidable in dovetail guideways 69 in the base board, two screws being provided, for each member, one to clamp the member in the guideway and one to clamp the workpiece.

In use, one places a panel workpiece 42, with a preformed straight longitudinal edge abutting the straight edge 53A of the fence 53, and so that the desired cut line extends at a location so that it will be underneath the slot 61 in the bridge 40. The bridge is clamped down on the workpiece by the device 65 and a saw is passed through the slot 61 and the waste material cut off, the cut being arranged so as to be to the right of the desired cut line as viewed in FIG. 1. A groove 50A is formed in the base 50 to accommodate the saw teeth.

The bridge is then released and the stop 56 is moved so that it is accurately opposite the calibration which indicates the desired length of the final workpiece and is clamped in place. The workpiece is then positioned against the stop 56 and the edge 53A of the fence, and the bridge is then clamped in place again and the workpiece is held in position by clamps 68.

A routing tool is then moved along the guideway with its rotating tool through slot 61 and, as it passes, it removes material from the end of the workpiece accurately to give the desired length of panel, the cut being perpendicular both to the face of the panel and to the longitudinal edge thereof against the fence 53. The bridge and clamps 68 are then released and the workpiece removed.

As can be seen in FIGS. 1 and 7 to 9 a slidable device 70 is movable along the length of the bridge, that is to say transversely of the fence 53. This is shaped, as shown in FIG. 7, to conform to the shape of the section 59, which thus acts as a guideway for the device 70. This device is, in essence, a profiled inverted L-shaped member, the two arms of the L each being provided with a number of holes 71 and 72, there being four of each hole. The holes are spaced apart from one another by an equal distance, but are offset at different distances from the edge of device 70 as indicated in FIGS. 8 and 9. A bush 73 or 74 is insertable into these holes, these bushes being of hardened material. The correct hole 72, for a particular thickness of workpiece is chosen, the bush inserted therein and a drill is passed through the central hole in bush, to provide a hole at the centre of thickness of the workpiece. A co-operating hole can also be formed in another workpiece at a corresponding location spaced from the edge in its face, so that a dowel fitted into both drilled holes will position the workpiece correctly relative to one another. As can be seen in FIG. 1, a number of holes 76, are provided in the bridge at specifically spaced locations from the hinge line, and therefore from the datum edge of the fence. Holes 76 are sufficiently large to accommodate a bush in any one of holes 71. These can be utilised to drill holes at specific locations in the workpiece, so that dowels fitted thereinto will be correctly spaced from one another, depending upon the standard dimension of the particular workpiece in question.

The base board can be provided with locating holes (not shown) for inserting guide members, so that the workpiece is accurately at 45° both to the fence and to the guideway of the bridge, so that a mitred corner can be formed on a workpiece whether it be wood or aluminium. Other angles of mitre can be used and devices can be provided on the cutter to give a thicknessing of the workpiece, this working rather in the manner of a vertical mill, and other cutters can be provided to form channels or grooves in the workpiece.

In FIG. 1 there is illustrated further bridge 80, at the lefthand end. This bridge may be fitted, if desired, and will be substantially the same as the first bridge, but in mirror image thereto. This can be utilised for squaring off accurately the other end of the workpiece, if it is desired, rather than simply turning the workpiece round having produced a parallel longitudinal edge in the manner described earlier.

A simpler device is illustrated in FIG. 10 which comprises a simple base member 100 providing a fence surface 101 and secured on top of this is a further elongate member 102 having a guideway 103 formed in the front face thereof. A transverse bridge member 104 has a central guideway 105 for guiding a router 106, as before, the guideway extending accurately perpendicular to fence surface 101.

The thus-formed assembly is mounted, by the user on top of a bench or table 107, the bridge member 104 being raised firstly by the member 100 and secondly by a spacer 108 at its end remote from the base member 100.

As before a workpiece 110 is offered up to the fence 101, resting on the working surface 107, and the router 106 is used to provide the accurately perpendicular edge. Again, this construction may be provided with a second bridge member similar to the member 104, but at the other end of the base member 100.

The guideway 103 is used to mount a stop member (not shown) to position the lefthand end of the workpiece 110.

It will be appreciated that the tooling jigs constructed and as illustrated in the drawings are particularly simple, and can be relatively inexpensive. The do-it-yourself man can therefore manufacture furniture from laminates, chipboard, or similar material, very accurately and at significantly less cost than has normally been necessary.

The jig according to the present invention can be utilised to produce locating holes in the panels and can also be used for routing recesses in the panels for securing fitments to hold the panels together or to mount hinges.

The jig described above is particularly suitable also for formation of knockdown furniture which can subsequently be reassembled and indeed can be used in the prototype shop of a furniture factory.

We claim:
1. A tooling jig comprising, in combination:
 (a) a base for supporting a workpiece;
 (b) a longitudinally-extending guide fence provided on said base, said guide fence defining a straight edge;
 (c) a bridge directly secured to said guide fence and positioned effective to overlie a workpiece placed against said guide fence; and
 (d) a guideway on said bridge extending accurately perpendicular to and intersecting the line of said straight edge, said guideway being adapted to guide for movement therealong a router accurately perpendicular to said straight edge.

2. A jig as claimed in claim 1 and further comprising means defining a slot in said bridge parallel to said guideway for the passage of a saw.

3. A jig as claimed in claim 1, wherein said base is an elongate member and said fence being formed by one side thereof, and wherein said bridge is affixed to said one side of said elongate member.

4. A jig as claimed in claim 1, wherein said base comprises a baseboard, with the guide fence extending upwardly therefrom.

5. A jig as claimed in claim 4, and further comprising means to clamp the bridge against the base board.

6. A jig as claimed in claim 4, and further comprising means on said baseboard to clamp a workpiece against said fence.

7. A jig as claimed in claim 1 and further comprising a calibrating device extending along said guide fence and an adjustable stop movable along said guide fence adjacent said calibrating device, whereby the end of the workpiece may be located against said stop a measured distance from the end edge cut by the router.

8. A tooling jig comprising, in combination:
 (a) a base board;
 (b) a guide fence hinged to the base board and extending upwardly therefrom, said guide fence defining a straight edge;
 (c) a bridge directly secured to said guide fence and positioned effective to overlie a workpiece placed against said fence; and
 (d) a guideway on said bridge extending accurately perpendicular to said straight edge, said guideway being adapted to guide for movement therealong a router accurately perpendicular to said straight edge.

9. A tooling jig comprising, in combination:
 (a) a base;
 (b) a guide fence provided on said base, said guide fence defining a straight edge;
 (c) first and second bridges each directly secured to said fence, said first and second bridges being spaced from one another and positioned effective to overlie a workpiece placed against said fence;
 (d) first and second guideways on said first and second bridges respectively, said guideways extending accurately perpendicular to said straight edge and each being adapted to guide for movement therealong a router accurately perpendicular to said straight edge.

10. A tooling jig comprising, in combination:
 (a) a base;
 (b) a guide fence provided on said base, said guide fence defining a straight edge;
 (c) a bridge directly secured to said fence and positioned effective to overlie a workpiece placed against said fence;
 (d) a guideway on said bridge extending accurately perpendicular to said straight edge, said guideway being adapted to guide for movement therealong a router accurately perpendicular to said straight edge;
 (e) a slider member movable along said bridge and having means defining at least one vertical hole and at least one horizontal hole therein;
 (f) a hardened bush positionable selectively in one of said holes, said bush comprising a central aperture for the passage of a drill, whereby a hole may be drilled accurately centrally in the end edge of the workpiece cut by said router, and the hole may be drilled accurately in the face of said workpiece adjacent said end edge.

11. A jig as claimed in claim 10, wherein there are a plurality of vertical holes staggered with respect to one another and a plurality of horizontal holes staggered with respect to one another to suit different thicknesses of workpiece.

12. A jig as claimed in claim 10, and further comprising holes in said bridge at specific spaced locations, said holes acting for the passage of the drill which has passed through said at least one vertical hole.

13. A tooling jig as claimed in claim 1 wherein said guide fence includes a plurality of holes longitudinally spaced along said guide fence.

* * * * *